United States Patent [19]
Rosen

[11] Patent Number: 5,263,581
[45] Date of Patent: Nov. 23, 1993

[54] LASER DISC PROTECTOR SYSTEM

[76] Inventor: Howard Rosen, 401 W. Superior St., Chicago, Ill. 60610

[21] Appl. No.: 806,304

[22] Filed: Dec. 13, 1991

[51] Int. Cl.$^5$ .............................................. B65D 85/57
[52] U.S. Cl. .................................. 206/313; 206/459.5
[58] Field of Search ...................... 206/303, 307–313, 206/444, 425, 232, 459.5; 383/105–107

[56] References Cited

U.S. PATENT DOCUMENTS

| | | | |
|---|---|---|---|
| 2,777,574 | 1/1957 | Brody | 206/313 |
| 2,932,387 | 4/1960 | Petersen | 206/312 |
| 3,199,768 | 8/1965 | Farmlett | 206/312 |
| 3,207,318 | 9/1965 | Gilbert | 206/309 |
| 3,411,698 | 11/1968 | Reynolds | 383/105 |
| 3,422,952 | 1/1969 | George | 206/313 |
| 4,339,034 | 7/1982 | Panveno | 206/313 |
| 4,620,630 | 11/1986 | Moss | 206/313 |
| 4,781,292 | 11/1988 | Sacherman et al. | 206/309 |
| 4,850,731 | 7/1989 | Young | 206/313 |
| 5,048,681 | 9/1991 | Henkel | 206/313 |

FOREIGN PATENT DOCUMENTS

| | | | |
|---|---|---|---|
| 0075301 | 3/1983 | European Pat. Off. | 206/313 |
| 1055964 | 1/1967 | United Kingdom | 206/313 |
| 1072844 | 6/1967 | United Kingdom | 206/313 |

*Primary Examiner*—Jimmy G. Foster
*Attorney, Agent, or Firm*—Martin Faier

[57] ABSTRACT

A laser disc protector system for holding a laser video disc which may have indicia describing the contents and which consists of a transparent envelope, the envelope comprising sheets of flexible plastic material secured together on their edges, one edge a being open to permit a laser disc package comprising a disc inserted in an anti-static sleeve which is contained in a cardboard jacket, which may be the manufacturer's original cover for the disc, to be inserted into and withdrawn from the envelope, one sheet of which may be rigid for holding the envelope upstanding, there being a flap over the open end of the envelope to contain the laser disc package positioned safely within the envelope when is arranged in a store for browsing by a customer, or during transport, rental or storage. The invention also relates to an indexing system for laser disc packages where a plurality of like such packages are arranged in transparent envelopes of the kind described one behind another in a bin, packed loosely to allow one package to be flipped away from another package for selective browsing through the packages, and to a method for arranging such a system which consists of the steps of inserting each laser disc package into a transparent envelope of the character described and arranging the envelopes upright in a bin for browsing therethrough by a consumer.

17 Claims, 1 Drawing Sheet

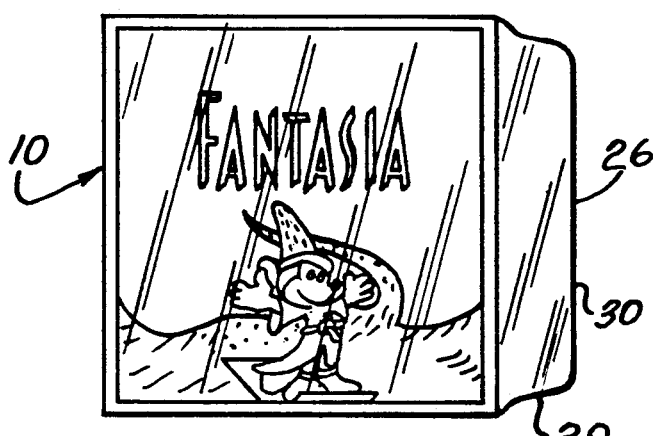
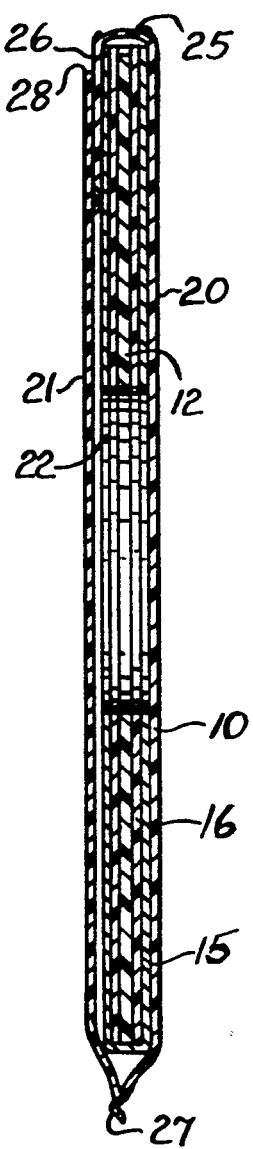
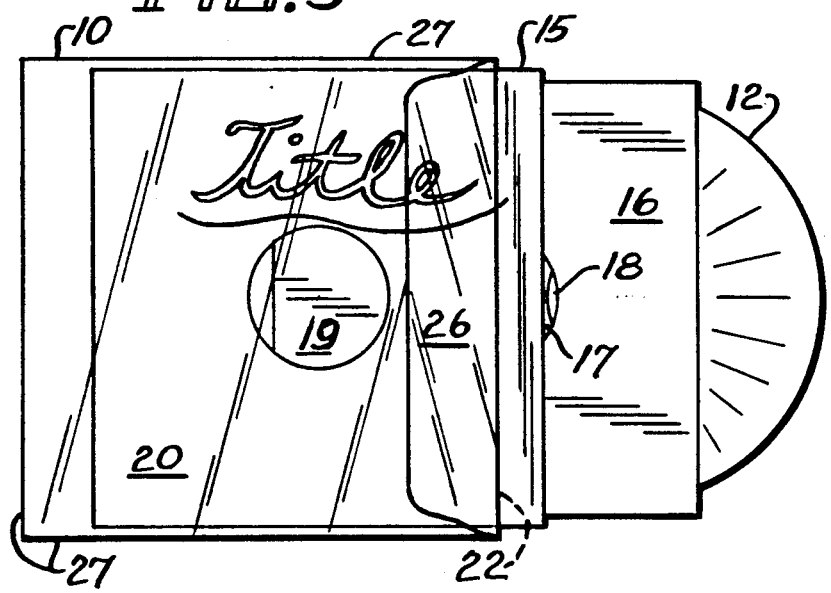
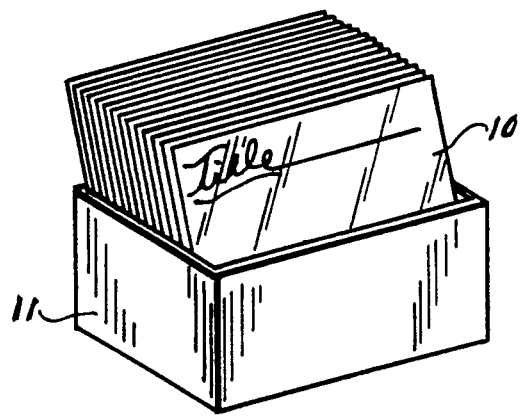

LASER DISC PROTECTOR SYSTEM

BACKGROUND OF THE INVENTION

This invention relates to a protector system for laser video discs, which is also useful in indexing and arranging titles and descriptive information available for review and selection by users in the environment of a video rental and sales store or a library. The invention also relates to a method for efficient organization of laser discs for transport and storage during rental or lending as well as for display in the library or store environment.

Laser video discs are normally packaged by the manufacturer in transparent shrink wrapped jackets with informative literature written on the outside thereof visible from the outside, of the shrinkwrapped package, and these jackets have become of substantial value to retail rental and sales storekeepers and libraries because is they contain descriptive information concerning the contents of the disc and consumers find these packages essential in making a selection of a disc for rental or purchase. However, conventionally, once the shrinkwrap is opened, the original cover or jacket usually becomes soiled and worn, and sometimes the valuable and sensistive laser disc is damaged.

In the prior art, some manufacturer's package their discs in a rigid plastic box called a "jewel box", but these boxes require substantial storage space and are easily subject to damage, such as cracking, fracturing, or scratching, because they are brittle. When damages these jewel box packages subject the disc to damage, sometimes caused by the breakage of the jewel box itself.

Laser discs are relatively expensive and sensitive so it is important to protect the disc and preferable to maintain the original cover in clean orderly condition. Also the condition of the original cover is important because the wholesale distributor usually will not accept return of the product or a subsequent secondary buyer will not purchase the product without the package being clean and in tact. The disc cannot be sold or rented at the best possible price if the original cover or jacket is damaged, missing or soiled.

For the above reasons, most video store operators and libraries are very protective of the manufacturer's packaging and the laser discs, and are concerned with maintaining such packages clean and unsoiled, although the original cover must also be is available to the public for use in selecting a disc for rental or purchase, as well as for transporting the selected package home and storing it, and, in the case of a rented or lent disc, back to the store or library. It is that dilemma of storekeepers, librarians and users who want to make these packages available for use but retain them in good condition that this invention seeks to solve.

SUMMARY OF THE INVENTION

These problems in maintaining and using conventional packages for laser discs may be substantially overcome by the package system and method embodying the present invention. By use of embodiments of the present invention, a convenient way is provided for protecting the valuable and sensitive laser disc while it is being transported or stored for rental or lending from the store or library. Using the novel system and method embodying the present invention, all of the displays are at counter height convenient for most people to use, and the laser disc is suitably protected from handling and abuse.

Applicant's display package consists of a special clear plastic envelope of sufficient dimension to contain most known laser discs and their cardboard jackets, in addition to a staticfree inner sleeve, which inhibits adherence of dust on the disc. Protection of the disc f rom adherence of dust is important, because these foreign bodies interfere with the picture or sound when the disc is played and sometimes become plated on the surface of the disc.

This novel envelope may also be constructed so that it is adequately rigid to be arranged upstanding in a display bin, but it is also suitably soft and expandable to permit easy entrance in and withdrawal from the envelope of the manufacturer's original cover or a substitute jacket and other indicia. The envelope may also have novel built-in relief and expandability to permit easy insertion of the manufacturer's original package, with its original cover, even if a set comprises two discs, without causing the assembled package to appear sloppy, while permitting the envelop contents to be easily removed. The envelop embodying the invention can be easily read as the consumer flips through a number of similar envelopes arranged in a series one behind the other in a bin. Preferably, each envelope has a closure flap, normally closed, for maintaining the laser disc package closed but easily accessible.

There is a tendency of many plastic to be archival, that is the plastic tends to stick to another piece of plastic. To avoid such inherent problems of either the disc sticking to the envelopes or the envelopes to stick to one another, not only is a flexible polyvinyl chloride material preferred, but it is preferred that the surface of the material should be textured with minute relief areas formed on the surface of the envelop (sometimes called an "orange peel" surface).

It is also desirable for the envelopes and a suitable bin for holding them to be dimensioned so that the bin can also house the envelopes during shipment and then be used by the retailer as a container for housing indexed envelopes to be used by customers is browsing for their laser disc selections.

OBJECTS AND ADVANTAGES OF THE INVENTION

It is the object of the present invention to provide a novel display package and container for laser discs of the character recited.

Another object is to provide a novel display package and container suitable for protecting a laser disc when it is in a store, or during transport or rental.

Another object is to provide a novel laser disc protector system which may comprise an antistatic sleeve for holding a laser disc, a jacket having indicia thereon for containing the sleeve, and a transparent envelope for housing the jacket and its contents.

Another object is to provide a display package which consists of a normally closed envelope suitably transparent for viewing of a laser disc, sleeve or jacket inserted therein.

Another object is to provide a display package which is suitably flexible for easy insertion of one laser disc or a set of laser discs, without making the package sloppy or too tight for easy insertion of the discs.

Another object is to provide a display package which is suitably rigid to permit like envelopes containing laser discs arranged one behind the other to be indexed upstanding and browsed through by a consumer.

Another object is to provide a series of transparent envelopes containing laser disc displays with indicia visible from the exterior thereof arranged in bins for indexed browsing and is selection by a consumer.

Another object is to provide a novel laser disc package which includes a plastic envelop having a textured skin for housing the disc.

Another object is to provide a novel display envelope of transparent material having a normally closed flap for containing a packaged laser disc sheathed in a anti-static sleeve and cardboard jacket in a predetermined selected position.

Another object is to provide a novel transparent envelope having reinforced and protected edges around its peripheries to protect a laser disc and packaging contained therein.

Another object is to provide for a novel method for efficient organization of laser discs in a video rental and sales store or library, and which is suitably versative for protecting such discs during transport and storage.

A further object is to provide a display and container system for laser disc packages which is inexpensive and efficient to arrange and use without damaging such packages or discs.

These and other objects and advantages of the invention will become more apparent as this description proceeds, taken in conjunction with the accompanying drawings.

BRIEF DESCRIPTION OF THE DRAWINGS

In the drawings:

FIG. 1 is a front elevations view of a laser disc display and container package embodying the present invention (with its flap open). is FIG. 2 is an enlarged sectional view of such a laser disc package (with its flap closed).

FIG. 3 is an plan of the arrangement of a laser disc packaged in a sleeve within a jacket contained in an envelope embodying the present invention.

FIG. 4 is a perspective view of a browsing bin holding a number of like envelopes containing laser disc packages embodying the invention arranged therein.

DESCRIPTION OF A PREFERRED EMBODIMENT

With reference to the accompanying drawings, an envelope 10 fabricated from transparent material, preferably made from sheets of polyethylene or poly vinyl chloride, is adapted to receive a cardboard jacket 15 of the kind used to originally package a laser disc. The outside surfaces of the jacket 15 usually describes the contents including the title of the work, its credits, a synopsis of the story or other work contained on the disc, and other information which may be helpful in interesting the consumer in the program.

As shown in FIG. 4, a series of like envelopes 10 may be arrange one behind another in a bin 11. This bin 11 may comprise a corrugated box having a conventional cover (not shown) which may be used by the envelope manufacturer to ship a supply of empty envelopes to the video store or library and then used to display envelopes containing the laser disc packages, which are usually arranged so that the envelopes may be indexed, for example by category or alphabetically or otherwise, and flipped for browsing by the consumer when selecting a desired laser disc title for purchase or rental, or sold directly to a consumer for housing a video laser disc collection.

In the store or library environment, once the desired title is selected, the consumer may inform an attendant of the selection, and the attendant may select the disc required by the consumer from a secured inventory away from access by the consumer, or the package and envelope selected may be delivered. Some stores or libraries, to preserve the origin cover jacket for future use when selling the laser disc, may remove the original jacket cover as soon as the goods is received from the manufacturer, and replace it with a neutral or proprietory cover, which may be open to the center of the disc, so that the title and similar identification data may be read from the outside of the envelop.

Particularly where the laser disc is rented to or lent by the consumer, so that its safety is of particular interest to the store or library, the laser disc jacket 15 and its contents may be placed into the envelop 10 for storage or transport to and from the user's home. A user may also protect his investement in laser discs by securing and using a stock of these envelopes to contain a collection of laser discs for safe handling once the manufacturer's package is opened.

To suitably protect the laser disc 12, preferable the disc is sheathed in an anti-static poly lined paper or Tyvek sleeve 16, which is dimensioned to fit within the cardboard jacket 15 and which inherently repels dusts and similar foreign material from its surface and contents. This sleeve 16 may have a central aperture 17, which is covered only by the anti-static polymer liner, which is transparent, so that the central label area 18 of the laser disc 12 is visible to reveal title and other data printed there.

The cardboard jacket 15 may also have an aperture 19 aligned with the aperture 17 in sleeve 16, so that the label area 18 is not obstructed when the jacket is in place, and, because the outer envelope 10 is also transparent, this label area 18 may also be viewed from the exterior of the envelope 10.

The envelope 10 may be fabricated from sheets of predetermined varying or homogenous rigidity. One larger sheet 20 of the envelop may be of relatively stiff plastic, and its adjacent smaller sheet 21 may be relatively flexible and open, so that the pocket 22 formed by the adjacent sheets 20 and 21 for containing the laser disc is flexible, permitting easy entry into the pocket while providing overall rigidity of the envelope 10 to permit it to be arranged in selected indexed position upstanding in the bin 11.

At least one of the sheets 20 or 21 is preferably fabricated from flexible poly vinyl chloride material having a special graining surface thereon, which is preferably archival. This material, sometimes in the trade called "orange peel", which has a textured surface like orange peel, allows the envelope 10 to expand enough to accommodate a second laser disc 12 without distorting the package, and prevents like envelopes from sticking to one another or to the laser disc. This orange peel like material has been found to have some memory, allowing it to return is to its formed dimension after the expansion is no longer required. Furthermore, this special flexible PVC material has significantly less glare, allowing the jacket 15 to be easily read without distortion. The variance in surface character also inhibits one plastic sheet 20 or 21 from sticking to the next, as PVC often is prone to do, thus making it easier to separate a stack of similar envelopes 10 and to open a closed envelop when admitting the laser disc 12 and its jacket 15 and sleeve 16 into the pocket 22.

This flexible Poly Vinyl Chloride material has been found to resist cracking, teasing or breaking, even at points of welding, such as the seams or hinge 25 on the flap 26 and peripheral edges 27 of the envelope 10. The material has also been found to function under wide ranges of temperatures without breaking down, and is usable at temperatures from −10 degrees F. up to the point where it resists cold cracking and to +185 degrees F. up to the point where is is capable of melting.

Preferably, the entire periphery of the adjacent sheets 20 and 21, and adjacent the edge of the flap 26, except the upper edge 28 of the smaller sheet 21, are sealed by means of heat-sealed seam 25 and 27, which forms a reinforced rolled edge on the envelope 10. The open entry to the pockets 22 is defined by a smooth open edge of the smaller sheet 21.

The flap 26 normally is closed against the sheets 20 and 21, but it may be manipulated to the open position shown in FIG. 1 for access to the pocket when admitting the laser disc 12 thereto or withdrawing it therefrom. If the open edges of the jacket 15 and the sleeve 16 are aligned with the open end of the pocket and flap 26, these members of the package system may be left in place while the laser disc 12 is installed into or removed from the pocket 22. This flap 26 is preferably fabricated with inwardly tapering side edges 29, commencing their tapering near the point where the flap 26 joins the adjacent edge of the larger sheet 20. Preferably, the free edges 30 of the flap 26 are also beaded to reinforce and provide a smooth edge for that member. Also, it is intended that the closed envelope 10 have the flap 26 tucker over the jacket 145 within the pocket 22. The sheets 20 and 21 may be fabricated from about 0.006 to about 0.020 gauge clear rigid poly vinyl chloride plastic.

While the embodiments of the invention have been described in considerable detail, it is not desired that the invention should be limited to the exact structure or steps described,, as the structure and method can be modified or changed without departing from the scope or spirit or the invention.

I claim:

1. A package for containing a laser disc, said package comprising:
    an envelop, at least a portion of which is transparent to reveal its contents,
        said envelop comprising sheets of plastic material secured together and sealed at their edges to define a pocket except at one edge where said envelop is open for admitting a laser disc into and withdrawing it from said envelop pocket,
    a jacket open at one end adapted for removable seating through said open edge and within said envelop pocket, and
    a sleeve open at one end adapted for removably receiving said laser disc therein and removably seating said sleeve and disc within said jacket,
        said sleeve being formed from paper like material and having antistatic material laminated thereto.

2. In the laser disc package recited in claim 1, wherein a flap is secured to one of said sheets arranged over said open edge.

3. In the laser disc package recited in claim 1, wherein said a portion of said jacket and sleeve is transparent and viewable from the exterior of said envelope.

4. In the laser disc package recited in claim 1, wherein said jacket is fabricated from cardboard.

5. In the laser disc package recited in claim 1, wherein at lest one of said sheets comprises flexible plastic.

6. In the laser disc package recited in claim 5, wherein said flexible plastic sheet comprises randomly textured non-archival material.

7. An indexing system for laser discs comprising: a plurality of like display packages each for holding a laser disc and packaging components having indicia thereon,
    each said display package comprising an envelope at least a portion of which is transparent to reveal the indicia of such packaging components,
    each said envelope comprising sheets of plastic material secured together on their edges, at least one edge of said envelope being open to permit said laser disc and packaging components to be admitted into and withdrawn from said envelope,
    each said envelope having a flap adjacent its open edge, said flap being normally closed against said sheets, but under manipulation movable to admit and exit said laser disc and packaging components into and from said envelope and a bin for containing said display packages upright arranged one display package behind another display package,
    said display packages being packed loosely in said bin to allow one such package to be flipped away from another of said packages for selective browsing through said plurality of packages
    each of said display packages having a rolled seam on the edges of said sheets spaced about the peripheries of said envelop, except where said envelop is open to admit a laser disc into its pocket.

8. In the indexing system recited in claim 7, wherein each of said display packages has a jacket adapted to contain said laser disc and fit into said envelope.

9. In the indexing system recited in claim 8, wherein said jacket has a sleeve adapted for containing said laser disc.

10. In the indexing system recited in claim 9, wherein said sleeve is lined with anti-static polymer material.

11. In the indexing system recited in claim 9, wherein a central area of said sleeve is apertured to reveal a label area of said disc.

12. In the indexing system recited in claim 9, where central areas of said jacket and sleeve have aligned apertures, and said disc has a label area visible from the exterior of said envelop through said apertures.

13. In the indexing system recited in claim 7, wherein said envelop has a textured skin which inhibits said envelopes from sticking to one another and from said laser disc.

14. A package for containing a laser disc having a label thereon arranged centrally of said disc, said package comprising:
    an envelop, at least a portion of which is transparent to reveal its contents,
        said envelop comprising sheets of plastic material secured together and sealed at their edges to define a pocket except at one edge where said envelop is open for admitting a laser disc into and withdrawing it from said envelop pocket,
    a jacket open at one end adapted for removable seating through said open edge and within said envelop pocket, and a sleeve open at one end adapted for removably receiving said laser disc therein and removably seating said sleeve and disc within said jacket, said sleeve and jacket having aligned central apertures adapted to reveal said disc label.

15. In the package recited in claim 14, wherein said envelop has a flap secured to one of said sheets arranged over said open edge adapted for smooth tucking into said pocket over said laser disc.

16. The package recited in claim 14, wherein said plastic envelop is flexible and has a randomly textured non-archival exterior skin.

17. The package recited in claim 14, wherein said sleeve is lined with a sheet of anti-static polymer material.

* * * * *